UNITED STATES PATENT OFFICE.

RUDOLPH BOEHRINGER, OF PLAINFIELD, NEW JERSEY, AND ALBERT EDWARD GESSLER, OF CLIFTON, STATEN ISLAND, NEW YORK.

PROCESS FOR THE PRODUCTION OF METALLATE SILICATE.

1,050,204.  Specification of Letters Patent.  Patented Jan. 14, 1913.

No Drawing.  Application filed June 17, 1910. Serial No. 567,502.

*To all whom it may concern:*

Be it known that we, RUDOLPH BOEHRINGER and ALBERT EDWARD GESSLER, subjects of the German Empire, residing, respectively, at 57 Sanford avenue, in the city of Plainfield, county of Union, and State of New Jersey, and at 59 Simonson avenue, in the town of Clifton, Staten Island, in the county of Richmond and State of New York, have jointly invented a new and Improved Process for the Production of Metallate Silicate, of which the following is a specification.

The object of our invention is to produce a commercial article adapted to the softening of water and for other purposes, which can be readily made, which is cheaper to manufacture and is more effective than any now known. And to this end our invention consists, in producing metallate silicate by making a solution of a soluble alkali salt of a metal hydroxid, as of aluminum, lead, zinc or tin and then mixing the same with a solution of an alkali silicate (sodium or potassium) and precipitating a metallate silicate of the metal employed. This product is then neutralized by washing, it is then filtered and when dry is ready for use.

In carrying out our process we preferably make a solution of the soluble alkali salt of the metal hydroxid in a receptacle by itself and then slowly introduce a solution of an alkali silicate into the solution of the alkali salt of the metal hydroxid and thereby precipitate a metallate silicate, providing there is not present too great an excess of caustic alkali. Should there be a sufficiency of caustic alkali present to maintain the ingredients in a state of solution the strength of the alkali is reduced until a precipitation of the metallate silicate is effected. For example: when using aluminum, take fifty parts of sodium aluminate (of about fifty per cent. strength) and dissolve it in about thirty five hundred parts of water and slowly run therein a solution of one hundred and twenty parts of sodium silicate (of about forty per cent. strength) dissolve in about five hundred parts of water when aluminate silicate will precipitate in a flaky form. This is washed until neutral; it is then filtered and dried when it is ready for use. The reaction in this case expressed in the form of a chemical equation is:

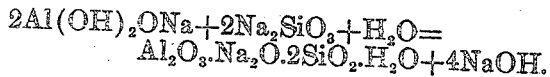

Should there be an excess of caustic alkali present or enough to prevent precipitation of metallate silicate it can be reduced by neutralizing with an acid and preferably with muriatic acid.

When using lead, we take, say fifty parts of lead acetate, dissolve it in two hundred parts of water and add three hundred and fifty parts of caustic soda solution (of about forty degrees Baumé strength) diluted with one thousand parts of water; to this solution add one hundred parts of soda silicate solution (of about forty per cent. strength) diluted with about five hundred parts of water when plumbite silicate will precipitate, this is washed until neutral, then filtered and when dry it is ready for use. The reaction expressed in the form of a chemical equation is:

$$Pb(ONa)_2 + Na_2SiO_3 + H_2O = PbO.Na_2O.SiO_2 + 2NaOH.$$

When using zinc, we take say fifty parts of zinc sulfate and dissolve it in about two thousand parts of water; we then add about five hundred parts of a forty degree Baumé caustic soda solution which has been diluted with one thousand parts of water precipitating and dissolving the zinc hydroxid; then one hundred parts of soda silicate solution (of about forty per cent. strength) diluted with five hundred parts of water is added when zincate silicate precipitates, this is washed until neutral, is then filtered and dried when it is ready for use. The reaction in this case, expressed in the form of a chemical equation is:

When using tin, we take say fifty parts of tin bichlorid and dissolve it in two thousand parts of water, then two hundred parts of a forty degree Baumé caustic soda solution diluted with a thousand parts of water is added precipitating and dissolving the tin hydroxid; to this one hundred parts of a sodium silicate solution (of about forty per cent. strength) diluted with five hundred parts of water is added when stannate silicate precipitates, this is washed until neutral, is then filtered and dried when it is ready for use. The reaction in this case, expressed in the form of a chemical equation is:

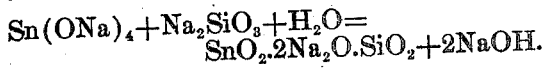

An excess of caustic alkali in a solution containing a soluble salt of a metal hydroxid and an alkali silicate is deemed to be that amount which by its presence maintains the said salts in a state of solution and which prevents the evolution and precipitation which would ensue if such excess of caustic alkali was neutralized or removed.

In specifying metallate silicate, it will be understood to mean combinations of soluble silicates with the soluble alkali salts of such metal hydroxids as have an acidic character.

By the means described an insoluble compound of a metal is formed which, in consequence of its physical properties and the chemical exchange of bases which takes place during its use, renders it especially adaptable for the softening of water and for other purposes.

Having described our invention what we claim and desire to secure by Letters Patent of the United States is:

1. The process of producing metallate silicate which consists; in combining a soluble alkali salt of a metal hydroxid solution with an alkali silicate solution under conditions of strength and in proportions operating to precipitate metallate silicate, all substantially as set forth.

2. The process of producing metallate silicate which consists; in making a solution containing a soluble alkali salt of a metal hydroxid; in making a separate solution containing alkali silicate, both calculated and proportioned to effect the evolution and precipitation of metallate silicate when the said solutions are brought in contact; in mixing the said solutions thereby precipitating metallate silicate, substantially as set forth.

3. The process of producing metallate silicate which consists, in mixing a solution of a soluble alkali salt of a metal hydroxid and a solution of an alkali silicate in proportions to effect a precipitation of metallate silicate and precipitating the same substantially as described.

4. The method of producing aluminate silicate which consists; in mixing a sodium aluminate solution with a solution of sodium silicate in chemically equivalent quantities and sufficiently dilute to cause the formation of a flaky precipitate of aluminate silicate, substantially as described.

RUDOLPH BOEHRINGER.
ALBERT EDWARD GESSLER.

In the presence of—
JOSEPH H. TUTTLE,
THOMAS A. GRADY.